(No Model.)
A. N. RUSSELL.
CORN SHOCKING DEVICE.
No. 513,734. Patented Jan. 30, 1894.
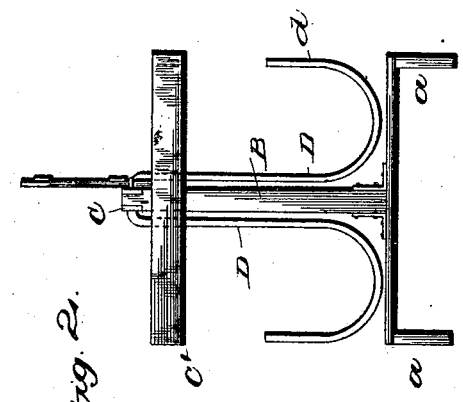
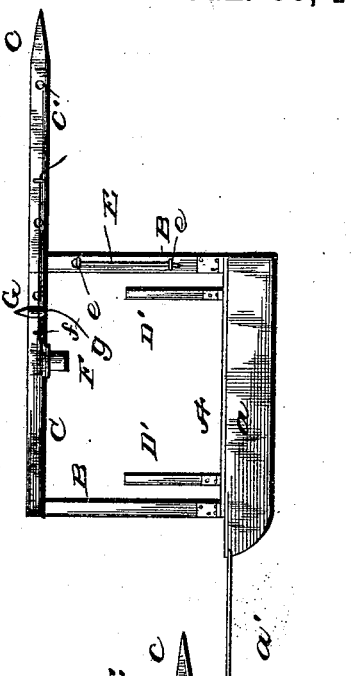
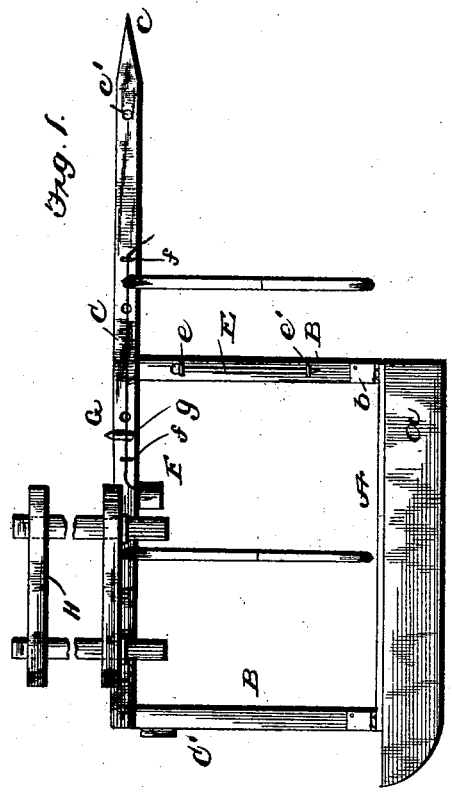
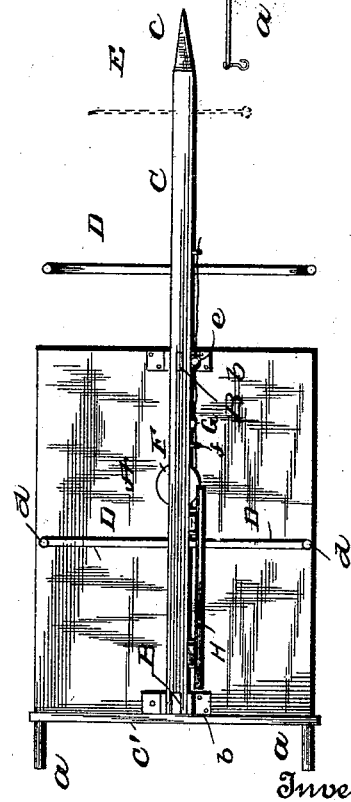
Witnesses
Inventor
A. N. Russell
by John Wedderburn
Attorney

UNITED STATES PATENT OFFICE.

ALBERT N. RUSSELL, OF MOUND VALLEY, KANSAS.

CORN-SHOCKING DEVICE.

SPECIFICATION forming part of Letters Patent No. 513,734, dated January 30, 1894.

Application filed February 11, 1893. Serial No. 461,852. (No model.)

*To all whom it may concern:*

Be it known that I, ALBERT N. RUSSELL, of Mound Valley, in the county of Labette and State of Kansas, have invented certain new and useful Improvements in Corn-Shocking Devices; and I do hereby declare the following to be a full, clear, and exact description of the invention, such as will enable others skilled in the art to which it appertains to make and use the same.

This invention relates to an improved shocking device for corn harvesters, and is adapted to be applied either to the corn harvester proper or connected to the rear of the harvester by means of a suitable draft apparatus.

The object of my invention is to provide a machine of this character that shall be cheap and simple in construction, efficient in operation, and one that requires but two men, and will successfully shock all the corn that is cut, and deposit the shocks in compact rows standing at great distances apart to permit easy access of the hauling wagons and also permit the field being plowed or worked while the shocks are standing.

With these objects in view, my invention consists in the peculiar construction of the various parts and their novel combination or arrangement, all of which will be fully described hereinafter, and pointed out in the claims.

In the drawings forming a part of this specification, Figure 1, is a side view of my improved device. Fig. 2, is a front view of the same. Fig. 3, is a top plan view, and Fig. 4, is a side view of a somewhat modified construction.

In carrying out my invention I employ a platform A, supported upon the runners $a$, to which are attached draft rods or chains $a'$. Vertical standards B, B, are secured upon the platform A, near its opposite ends, said standard being held in position by means of the angled plates $b$, and to the upper ends of the standards is secured a horizontal beam C, said beam projecting rearward a considerable distance beyond the platform, and is pointed at its rear end as shown at $c$, the purpose of which will appear farther on. A cross piece C' is secured to the forward standard to prevent the operators being thrown forward. Depending arms D, D, are attached to the beam C, upon opposite sides of the same, said arms extending downward nearly to the platform and are then curved outwardly and upwardly as shown at $d$, providing a holder for the corn that is gathered from the field preparatory to shocking, and as these arms are arranged upon both sides of the beam, the corn can be collected from both sides of the device, and when enough corn has been collected and placed in the arms to produce a large shock, the machine is stopped, and the shock formed, tied and dropped.

In order to form the shock, I employ a rest bar E, which normally rests in staples $e$ $e$, driven in the rear standard, B, but after a sufficient quantity of corn has been collected in the arms D, D, this bar is withdrawn from the stables, and passed through a horizontal aperture $c'$ made in the beam C, near its rear end, said bar projecting laterally from the beam an equal distance in each direction, as clearly shown in Fig. 3.

F, indicates a twine box or holder secured to the beam, and $f$, $f$, the guides for carrying the twine to the rear portion of the beam. A knife G, is placed in a sheath $g$, attached to the side of the beam, and within easy reach of the operator, so that he can easily cut the binding twine after the shock has been tied.

After the bar E, has been placed in the aperture $c'$ the corn is removed from the arms D, D, and leaned against the bar E, on each side of the beam C. A rope is then drawn around the shock near its head, and the shock given shape. The binding twine is now wrapped around the shock, tied and cut. The bar E, is then withdrawn, and the machine moved forward, and as this is done the beam C, (which when the shock was made passed centrally through the same) is withdrawn from the shock, which is left standing, and inasmuch as each pair of arms will hold a great deal of corn, the shocks will be quite large, and will be dropped in compact rows far apart so that the hauling wagon can easily pass from one to another. The end of the beam, being pointed, is passed easily through the shock without impairing the same.

In Fig. 4, I have shown a somewhat modified construction in which the arms D, D, are dispensed with, and vertical arms, D' D' are attached to the platform near the edges of the same, and serve to hold the corn in place upon the platform. The other features of the device, however, are the same as those already described.

Staples are secured on the one side adjacent to the front end of the beam C, and are adapted to removably receive the lower ends of uprights of a fender H, for assisting the operators of the machine while working in windy weather.

Having thus described my invention, what I claim, and desire to secure by Letters Patent, is—

1. In a corn shocking device, the combination with a platform of centrally located standards at opposite ends of said platform, a horizontal beam connected to the upper ends of said standards, and extending over the entire platform, said beam extending centrally rearward beyond the platform and formed with a pointed terminating end and a transverse opening in advance of said end, a rest bar E removably held in connection with the rearmost standard and adapted to be withdrawn therefrom and inserted in the transverse opening of the beam, holding arms, a twine holder on the said beam, twine guides on the sides of said beam, and a knife sheath and knife also attached to said beam adjacent to the twine holder, substantially as described.

2. In a corn shocking device, the combination with a platform of the standards and central beam, the holding arms and the rest bar adapted to be inserted in the central beam, substantially as shown and described.

3. In a corn shocking device, the combination with a platform of the standard and central beam, the depending arms curved up at their lower ends, and the rest bar adapted to be passed through the central beam, substantially as described.

In testimony whereof I have signed this specification in the presence of two subscribing witnesses.

ALBERT N. RUSSELL.

Witnesses:
JAMES BLACKERBY,
B. H. SHARP.